United States Patent [19]
Hill

[11] 3,786,300

[45] Jan. 15, 1974

[54] DYNAMIC CONVERGENCE CIRCUITS

[75] Inventor: Michael Walter Hill, Pinner, England

[73] Assignee: RCA Corporation, New York, N.Y.

[22] Filed: May 17, 1971

[21] Appl. No.: 143,861

[30] Foreign Application Priority Data

May 18, 1970 Great Britain .................. 23,940/70
May 18, 1970 Great Britain .................. 23,941/70

[52] U.S. Cl. ...... 315/13 C, 315/13 CG, 315/27 GD
[51] Int. Cl. .......................................... H01j 29/50
[58] Field of Search ..................... 315/13 C, 13 CG, 315/27 GD

[56] References Cited

UNITED STATES PATENTS

| | | | |
|---|---|---|---|
| 3,114,858 | 12/1963 | Schopp | 315/13 C |
| 3,422,303 | 1/1969 | Chipman | 315/13 C |
| 3,440,479 | 4/1969 | Brockman | 315/13 C |
| 3,519,875 | 7/1970 | Brockman | 315/13 C |
| 3,531,682 | 9/1970 | Jarosz | 315/13 C |
| 3,571,653 | 3/1971 | Hansen et al. | 315/27 GD |
| 3,375,398 | 3/1968 | Ohlhorst | 315/13 C |

*Primary Examiner*—Benjamin R. Padgett
*Assistant Examiner*—P. A. Nelson
*Attorney*—Eugene M. Whitacre

[57] ABSTRACT

Vertical rate convergence circuit provides respective waveforms for control of vertical convergence winding energization during scanning of top raster half and bottom raster half. A pair of convergence windings are interconnected with sources of the respective waveforms in a circuit arrangement providing respective potentiometers for effecting master and differential control of the individual winding currents during each raster half scanning interval. Unidirectional current conducting means in association with one or both of the differential control potentiometers serve to reduce interaction between the control settings. In one embodiment, fixed terminals of each differential control potentiometer are linked to respective convergence coil terminals by individual diodes poled to effectively open-circuit one differential control potentiometer while placing the other differential control potentiometer in circuit with the coils during top scanning, and to effect complementary operation during bottom scanning.

8 Claims, 7 Drawing Figures

PRIOR ART

Figure 1:
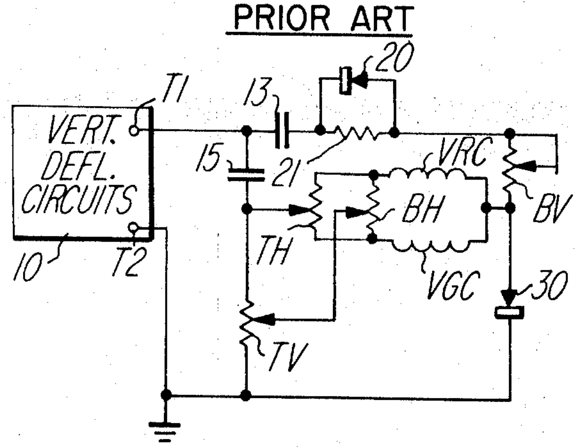

INVENTOR.
Michael W. Hill
BY William H. Meagher
ATTORNEY

INVENTOR.
Michael W. Hill
BY William H. Meagher
ATTORNEY

DYNAMIC CONVERGENCE CIRCUITS

The present invention relates generally to dynamic convergence circuits for a multibeam color kinescope, and particularly to novel and improved vertical (i.e., field) rate convergence circuits therefor.

It is customary in color television receivers employing a multibeam kinescope, such as the conventional three-gun, shadow-mask kinescope, to provide dynamic correction of beam misconvergence errors that inhere in the operation of such devices. The nature of the correction requires energization of beam path altering structure with waveforms at both line and field rates. A widely accepted approach to the problem utilizes individual electromagnets associated with internal pole pieces confining their effect to individual ones of the beams, and with separate windings on each electromagnet for respective vertical and horizontal frequency control.

It is a practical necessity that the dynamic convergence circuitry of a color television receiver incorporate a set of controls that permit adequate adjustment of the convergence currents to adapt the correction to the particular pattern of misconvergence errors encountered.

In the conventional convergence structure associated with a delta beam arrangement, the beam shifts for red and green are diagonal (involving both vertical and horizontal components of motions) while the beam shift introduced by the blue convergence winding is vertical only; the diagonal axes of red and green beam motion are crossed. Similar sense changes in red and green convergence currents introduce opposing horizontal shifts of the red and green beams accompanied by common direction vertical shifts. Conversely, mutually opposed changes in red and green convergence currents introduce opposing vertical shifts of the red and green beams accompanied by common direction horizontal shifts. By interrelating the red and green convergence winding energizations such that both master and differential control of their currents can be effected, the matching of red and green beam landing points can be separated into convenient horizontal line and vertical line alignment adjustments. Appropriate adjustment of the blue convergence current completes the horizontal line alignment.

In many of the misconvergence patterns that require correction, the misconvergence at the top of the picture does not match the misconvergence at the bottom of the picture. A practical convergence adjustment arrangement must take this into account by providing some facility for altering end-of-scan waveform magnitude relative to beginning-of-scan waveform magnitude. A difficulty common in many prior art circuit arrangements is that a control provided to solve this problem by adjusting, for example, the end-of-scan magnitude relative to a beginning-of-scan magnitude (set by another control) tends to disturb the beginning-of-scan magnitude, requiring readjustment of the other control.

U.S. Pat. No. 3,491,261, issued on Jan. 20, 1970 to Michael W. Hill and Lawrence E. Smith, discloses vertical rate convergence circuits incorporating provisions for substantially confining the effect of each control to a particular half of the picture. In the circuitry of the patent, the red and green vertical convergence windings are effectively paralleled and driven at each end with a respectively different modification of a vertical rate waveform derived from the receiver's vertical deflection circuit. The drive circuit at one end utilizes an arrangement of diodes and resistors to provide drive only during the end-of-scan half of the vertical trace interval. The circuit output appears across a diode which conducts during the beginning-of-scan interval, minimizing the circuit's effect during that period. A second drive circuit supplies a waveform to the opposite end of the paralleled windings. The waveform is effective in controlling winding current during the conduction of the above-mentioned diode (i.e., during the beginning-of-scan half of the trace interval), but has little effect thereon when the diode is open due to the altered impedance of the load. Master and differential controls are associated with each drive circuit, whereby horizontal line alignment and vertical line alignment adjustments may be individually made for top and bottom of the raster.

The present invention is directed to modifications of vertical rate convergence circuitry of the Hill, et al., patent type, the modifications serving, inter alia, to ensure to a greater degree avoidance of interaction between the respective controls.

In accordance with the various embodiments of the present invention, provision is made for additional unidirectional current conducting means in association with one or both of the differential controls of the convergence circuit, with poling of the additional unidirectional current conducting means appropriate to isolation of one differential control during the active period of another.

Advantages of the present invention will be readily apparent to those skilled in the art upon a reading of the following detailed description, and an inspection of the accompanying drawings, in which:

FIG. 1 illustrates schematically a prior art vertical rate convergence circuit pursuant to the aforesaid Hill, et al. patent; and FIGS. 2, 3, 4, 5, 6 and 7 illustrate schematically modifications of the FIG. 1 circuit pursuant to various embodiments of the present invention.

In the prior art circuit of FIG. 1, the vertical deflection circuits of a color television receiver, represented by block 10, provide between output terminals T1 and T2 an output voltage of a partially integrated sawtooth waveshape (i.e., sawtooth plus parabola) for use by the convergence circuitry.

A first drive circuit coupled between the source terminals T1 and T2 includes, in series in the order named: a coupling capacitor 13; the parallel combination of a resistor 21 and a diode 20; a potentiometer BV disposed as a variable resistor; and a diode 30 (the diodes 30 and 20 being oppositely poled in the series circuit). A second drive circuit coupled between terminals T1 and T2 comprises a C-R differentiating circuit including, in series in the order named: a capacitor 15; and the resistance of a variably tapped potentiometer TV.

The vertical convergence windings VRC and VGC of the respective red and green convergence magnets are directly tied at one end to the junction of variable resistor BV and diode 30. Bridging the opposite ends of the windings VRC and VGC are, in parallel, the resistance elements of potentiometers BH and Th. The variable tap of potentiometer BH is directly connected to the variable tap of potentiometer TV, while the variable tap of potentiometer TH is connected to the junction of capacitor 15 and the resistance element of potentiometer TV.

In operation of the first drive circuit, the positive-going portion of the input waveform, as passed by capacitor 13, (illustratively occurring during the beginning-of-scan interval) causes conduction by diode 30 and renders diode 20 non-conducting. There is a consequent absence of significant drive from the first drive circuit during the beginning-of-scan interval, the diode action causing severe attenuation of the input waveform at the BV-diode 30 junction. However, during the succeeding half of the vertical trace interval, diode 30 becomes non-conducting and diode 20 conducts; the negative-going portion of the input waveform is presented across the non-conducting diode 30 without severe attenuation, and the first drive circuit thus provides drive during the end-of-scan period. Potentiometer BV, as a variable series resistor in the first drive circuit, provides a master amplitude control for red-green winding currents in the end-of-scan period, and thus is suitable for vertical line alignment at the raster bottom.

The second drive circuit serves to differentiate the partially integrated sawtooth input to provide a substantially sawtooth voltage across the resistance element of potentiometer TV. During the beginning-of-scan period, when diode 30 is conducting, the second drive circuit sees a relatively low impedance load (including the windings VRC and VGC in series with conducting diode 30) and therefore provides significant current drive through the windings. Potentiometer TV provides a master amplitude control for red-green winding currents during this beginning-of-scan period and thus is suitable for vertical line alignment at the raster top. When diode 30 opens, the load seen by the second drive circuit rises to a high impedance value, and relatively little current control is afforded thereby.

Potentiometer BH (through which current from the first drive circuit returns to the grounded terminal T2) provides a means for altering the division of current drive from the first drive circuit between the windings VRC and VGC, and accordingly provides a control for horizontal line alignment at the raster bottom. Potentiometer TH provides a means for altering the divison of a current drive from the second drive circuit during the first half of scan, and thus provides a control for horizontal line alignment at the raster top.

While the above-described prior art circuit is advantageous in confining the primary effect of each control to a particular half of the raster, there remains, nevertheless some degree of interaction between the controls. For example, current is supplied during raster top scanning from the second drive circuit by two paths: one via the top horizontal line control TH, and the other from the tap of the top vertical line control TV via the bottom horizontal line control BH. This tends to cause interaction between the top and bottom horizontal line controls.

Figure 2:
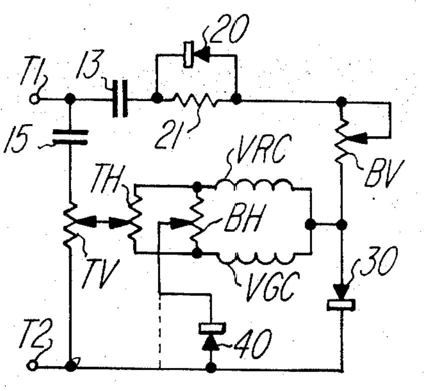

FIG. 2 illustrates a modification of the prior art arrangement of FIG. 1 which serves to reduce the aforesaid tendency to interaction between the respective differential (horizontal line) controls. In the modified circuit of FIG. 2, the adjustable tap of potentiometer TH is connected directly to the adjustable tap of potentiometer TV, while the adjustable tap of potentiometer BH is returned to the source terminal T2 by a path independent of potentiometer TV. In this modified arrangement, current is supplied from the second drive circuit during raster top scanning solely via the top horizontal line control TH, whereby tap adjustment of the bottom horizontal line control BH does not interfere with horizontal line alignment at the raster top.

However, if the independent return of the potentiometer BH tap to terminal T2 is effected by a simple wire connection (as indicated in dotted lines in FIG. 2) a penalty is paid for the interaction reduction: viz., the sensitivity of the circuit to the adjustment of the top vertical line control TV is reduced because part of the current supplied therefrom during raster top scanning is diverted to terminal T2 (via potentiometer BH) without passing through the windings VRC, VGC. Attempts to reduce this effect by increasing the resistance value of potentiometer BH merely result in increased drive requirements during the second half of scan; thus, in either case, the net result is an increase in input drive requirements.

To allow the desired reduction in interaction between the differential controls without significantly increasing drive requirements, the independent return of the tap of potentiometer BH to terminal T2 is effected (as illustrated in solid lines in FIG. 2) via an additional diode 40, poled to be nonconducting during raster top scanning. With this arrangement, tap adjustment on potentiometer BH has no effect on convergence winding currents during raster top scanning, and no part of the current supplied from the tap of potentiometer TV during raster top scanning is diverted from the windings via the tap on potentiometer BH. During the scanning of the raster bottom, diode 40 conducts and provides a low impedance return path for current from the first drive circuit.

Figure 3:
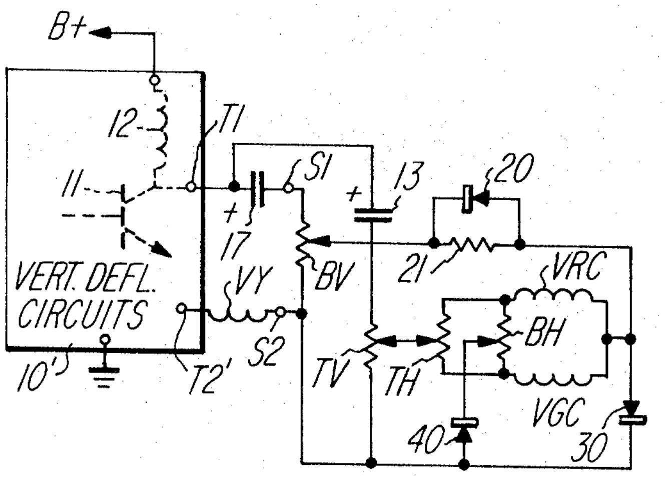

It is sometimes convenient to pass the vertical yoke sawtooth current through a suitable circuit to develop the input waveforms for the vertical rate convergence circuitry. FIG. 3 illustrates an adaptation of the FIG. 2 circuitry for such an input source arrangment. The receiver's vertical deflection circuits (generally represented by block 10') incorporate suitable means (such as a transistor output circuit, partially shown in dotted lines, including an output transistor 11 having its collector electrode connected to output terminal T1', and to a suitable B+ supply point via a choke 12) for passing a current of sawtooth waveform through the vertical deflection yoke winding VY.

The yoke current passes between terminals T1' and T2' of the deflection circuit 10' via a path including, in series, a large-valued DC blocking capacitor 17 and the vertical yoke windings VY. Interposed as a series element in the yoke current path is the resistance element of potentiometer BV, one fixed terminal of potentiometer BV being connected to capacitor 17 (at terminal S1) and the other fixed terminal of the potentiometer being connected to winding VY (at terminal S2). The adjustable tap of potentiometer BV is connected to terminal S2 via the remaining elements of the first drive circuit (i.e., via the parallel combination of diode 20 and resistor 21, in series with diode 30). The differentiating circuit, comprising the second drive circuit, is connected across the series combination of blocking capacitor 17 and the resistance element of potentiometer BV; i.e., the capacitor 13 and the resistance element of potentiometer TV are connected in series between terminals T1' and S2.

In the FIG. 3 circuit, the sawtooth yoke current passing through the series resistance element of potentiometer BV develops a sawtooth voltage between terminals S1 and S2. Adjustment of the tap on potentiometer BV permits selection of a portion of this voltage for application to the first drive circuit (in which diodes 20 and 30 perform as in the previously described circuits). The second drive circuit (comprising the differentiating circuit combination of capacitor 13 and potentiometer TV) operates as in the previously described circuits, developing an essentially sawtooth voltage across potentiometer TV in response to the input waveform (a sawtooth plus parabola waveform, the parabolic waveform appearing across blocking capacitor 17 as sawtooth current is passed therethrough). As in the FIG. 2 circuit, the return of the tap of potentiometer BH (bottom horizontal line control) to terminal S2 via diode 40 ensures reduced interaction between controls TH and BH. During raster bottom scanning, conducting diode 40 proves a low impedance return path for current from the first drive circuit, with potentiometer BH providing differential control of the red and green convergence winding currents. During raster top scanning, nonconduction of diode 40 precludes current diversion to terminal S2 via the tap on potentiometer BH.

It may be noted that halfway through the scanning of the raster, when the value of the sawtooth voltage wave across the master control potentiometers is substantially zero, none of the three diodes 20, 30, 40 are conducting. The result is that adjustments of the various controls have substantially no effect on center convergence (a desirable effect, avoiding interaction between dynamic convergence control settings and static convergence magnet adjustments).

Figure 4:
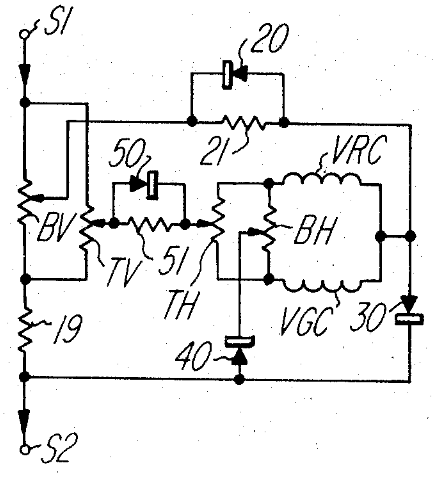

FIG. 4 illustrates a modification of the circuitry of FIG. 3, wherein the second drive circuit is particularly modified. As in FIG. 3, the bottom vertical line control potentiometer BV is interposed in the yoke current path between terminals S1 and S2, with, however, a fixed resistor 19 (providing a control range limiting effect) in series therewith. In place of the differentiating circuit approach employed in the previously described embodiments to obtain a driving waveform for the beginning-of-scan interval, the FIG. 4 circuit employs a different approach employing an additional diode in association with an input sawtooth voltage source akin to that employed for the first drive circuit.

In particular, the resistance element of the top vertical line control potentiometer TV is interposed in the yoke current path, in parallel with the resistance element of potentiometer BV. The adjustable tap of potentiometer is connected to the tap of the top horizontal line control potentiometer TH by means of a network comprising diode 50 in parallel with resistor 51. Diode 50 is poled for conduction during the scanning of the top half of the raster (For ease in discerning the active current paths during the respective halves of the raster scanning, arrows are associated in FIG. 4, and subsequent FIGURES, with the leads linked to terminals S1 and S2 to indicate the direction of current flow during the top half of the picture.)

It will be noted that during raster top scanning, diodes 50 and 30 are conducting so that potentiometer TV is effective as a master amplitude control, and potentiometer TH is effective as a differential control, to determine the currents in convergence windings VRC and VGC. The combined effect of nonconduction of diode 20 and conduction of diode 30 renders the first drive circuit ineffective whereby the adjustment position of the tap of potentiometer BV is noninterfering (as in the previously described embodiments). The nonconduction of diode 40 prevents interference from the adjustment position of the tap of potentiometer BH. Conversely, during raster bottom scanning, diodes 20 and 40 are conducting so that potentiometer BV is effective as a master amplitude control, and potentiometer BH is effective as a differential amplitude control, to determine the currents in convergence windings VRC and VGC. The nonconduction of diodes 50 and 30 render the second drive circuit ineffective, whereby the adjustment positions of the taps on potentiometers TH and TV are noninterfering.

In the FIG. 4 circuit, independence of center convergence from the dynamic control adjustments is ensured to an excellent degree, since, at the middle of scan, none of the four diodes 20, 30, 40 and 50 is conducting, whereby substantially no current may flow in the convergence windings VRC and VGC. The resistors 21 and 51 allow control of the convergence waveform shape in two ways: each, by permitting a selectable amount of current in shunt with the associated diode allow some degree of control of the winding current during the associated diode's conduction period; and each acts as a damping resistor for horizontal rate convergence waveforms induced in the vertical convergence windings which would otherwise tend to affect the time of conduction of the associated diode.

An advantage of the input waveform source arrangement of FIG. 4 is that any given magnitude of current through the yoke (winding VY) establishes a correlated magnitude of current available to the convergence windings (VRC and VGC). As a consequence of the correlation, there is substantially no change in convergence as picture height is adjusted.

The circuit arrangement of FIG. 4 is also advantageous with regard to temperature effects. As the ambient temperature in which the circuit is operated increases, the resistance of windings VRC and VGC also increases. However, the voltage drop across the diodes reduces as the ambient temperature increases. By properly proportioning the circuit values, the two effects can be made to substantially cancel, leaving the winding currents unaffected by temperature variations.

Figure 5:
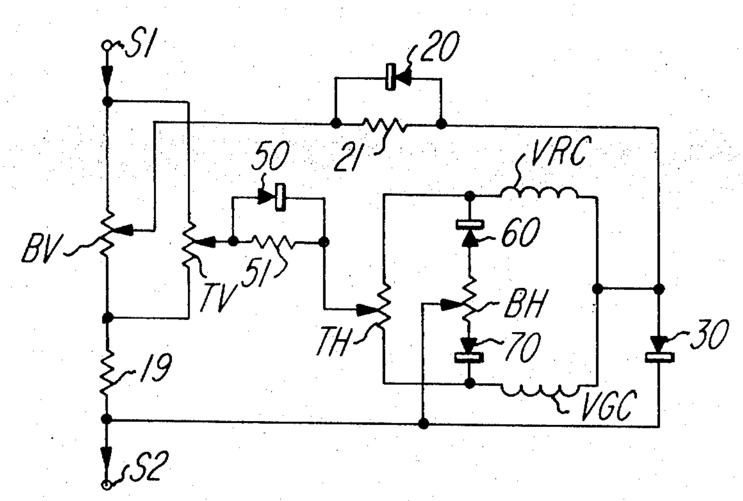

FIG. 5 illustrates a modification of the circuit of FIG. 4, retaining the advantages of the latter but providing an enhanced range for the top horizontal line control potentiometer TH.

The enhanced range advantage is of particular interest in use of the circuitry with wide-angle deflection (e.g., 110°) color kinescopes. In the case of 110° deflection, there can be a marked difference in the convergence ampere-turns required to converge vertical lines in the top and bottom halves of the picture-the difference being substantially greater than in the case of 90° deflection, for example. If, under these circumstances, the current required for top vertical line alignment is small, then the possibility of effecting horizontal line alignment at the top is inherently reduced (since the top horizontal line control serves only to alter the division of the total current, selected by the top vertical line control, between the respective windings). To maximize the division effect of the top horizontal line control (TH), it is desirable that as little unbalance current as possible flow through the paralleled resistance element of the bottom horizontal line control potentiometer BH. In this regard, it may be noted that while the presence of diode 40 in the circuits of FIGS. 2, 3 and 4 precluded (during top scanning) the diversion of current from the windings via the tap of potentiometer BH, diode 40 did not prevent the flow of a range-reducing unbalance current between the fixed terminals of potentiometer BH during raster top scanning.

The reduction of the aforesaid unbalance current flow can be effected by increasing the resistance value between the fixed terminals of potentiometer BH to a value large relative to the winding resistance. Such a solution is unsatisfactory from two points of view; firstly, the total voltage drop across the circuit is increased; and, secondly, the exact current waveform required through the windings is less easily obtained with increase in the total series resistance. The FIG. 5 solution avoids these difficulties by eliminating the range-reducing unbalance current in a different manner.

In the FIG. 5 circuit arrangement, a diode 60 is interposed in the connection between one fixed terminal of potentiometer BH and the end terminal of winding VRC, and a diode 70 is interposed in the connection between the other fixed terminal of potentiometer BH and the end terminal of winding VGC. The diodes 60 and 70 are poled so as to be non-conducting during the raster top scanning. As a result, the range of the top differential control (i.e., top horizontal line control TH) is enhanced, since no range-reducing unbalance current can flow between the fixed terminals of potentiometer BH during raster top scanning. Of course, the non-conduction of diodes 60 and 70 during raster top scanning also serves to preclude diversion of current via the tap of potentiometer BH during top scanning, eliminating the need for diode 50 in the return of the tap to terminal S2. Thus, in the FIG. 5 circuit, a wire connection suffices between the tap of potentiometer BH and and terminal S2. The return path for currents from the first drive circuit during raster bottom scanning in the FIG. 5 arrangement is via conducting diodes 60, 70, the differential control potentiometer BH and the wire connection between the potentiometer BH tap and terminal S2.

Figure 6:
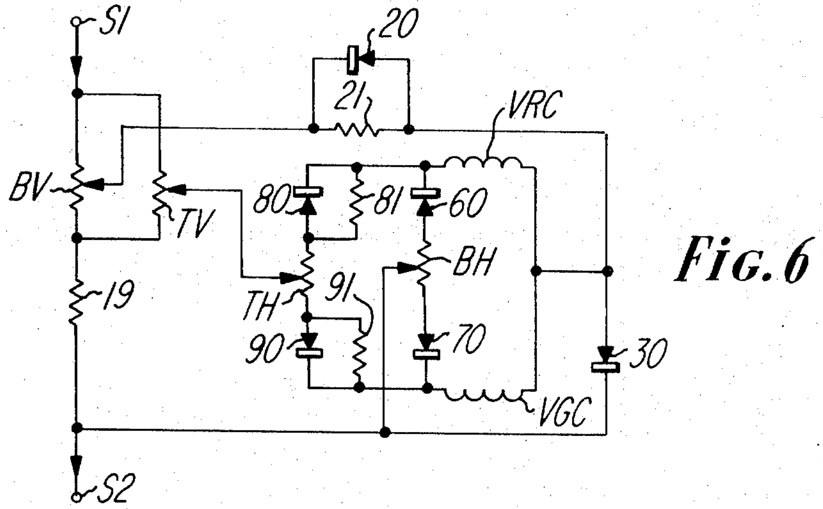

A further circuit modification is illustrated in FIG. 6, with the approach discussed above for FIG. 5 extended to provide range enhancement for the bottom differential control (i.e., bottom horizontal line control BH). In the FIG. 6 circuit arrangment, a diode 80 is interposed in the connection between one fixed terminal of potentiometer TH and the end terminal of winding VRC, and a diode 90 is interposed in the connection between the other fixed terminal of potentiometer TH and the end terminal of winding VGC. The diodes 80 and 90 are poled so as to be nonconducting during the raster bottom scanning, enhancing the range of bottom horizontal line control BH, since substantially no range-reducing unbalance current can flow between the fixed terminals of potentiometer TH during raster bottom scanning.

With diodes 80 and 90 serving to link the second drive circuit to the windings VRC and VGC during raster top scanning and to decouple the second drive circuit therefrom during raster bottom scanning, the need for diode 40 in the connection between the taps of potentiometers TV and TH is eliminated. A wire connection therebetween accordingly suffices in the FIG. 6 arrangement. However, in order to perform the waveform control function served in the FIG. 4 and 5 circuits by resistor 51, a resistor 81 is shunted across diode 80 and a resistor 91 is shunted across diode 90.

With the FIG. 6 arrangement, the resistance values of the differential control potentiometers may be optimized separately (without unduly increasing the total voltage drop across the circuit, or departing from proper waveform shape).

Figure 7:
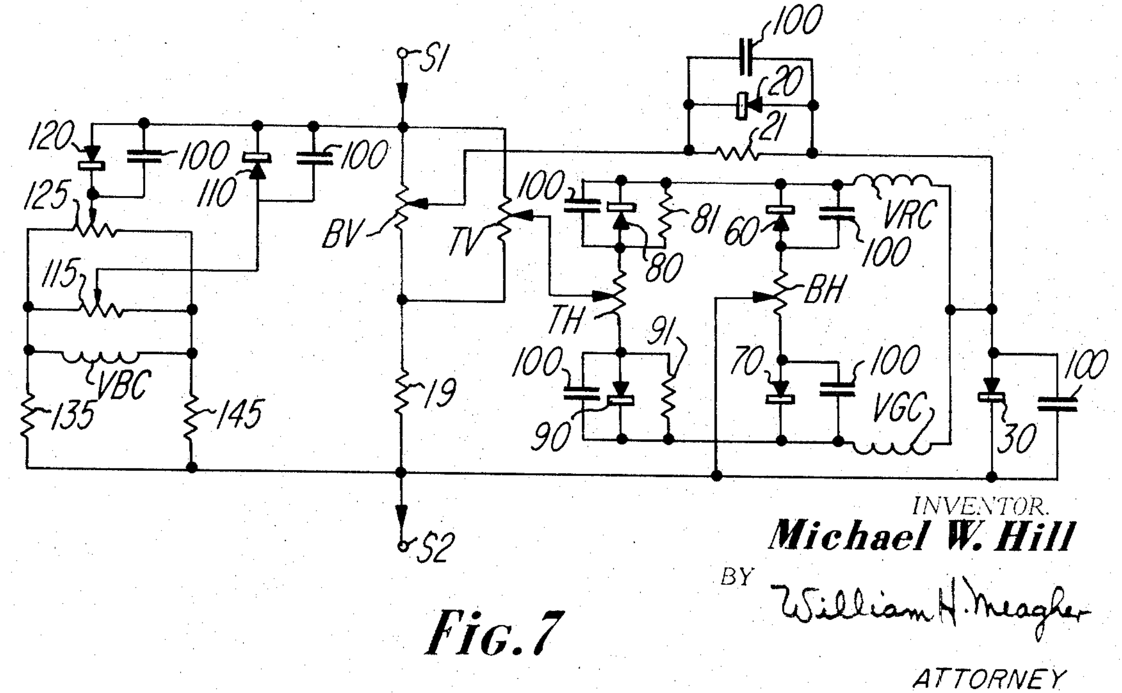

FIG. 7 illustrates a complete vertical rate convergence circuit, adding to the circuit of FIG. 6 suitable circuitry for energizing a blue convergence winding. In the circuit arrangement of FIG. 7, the blue vertical convergence winding VBC is shunted by the resistance element of a top blue convergence control potentiometer 125, and also by the resistance element of a bottom blue convergence control potentiometer 115. The adjustable tap of potentiometer 115 is connected to terminal S1 by means of a diode 110 poled for conduction during raster bottom scanning, while the adjustable tap of potentiometer 125 is connected to terminal S1 by means of a diode 120 poled for conduction during raster top scanning. One end terminal of winding VBC is connected to terminal S2 by means of a resistor 135, while the other end terminal of winding VBC is connected to terminal S1 by means of a similarly valued resistor 145.

It will be appreciated that, by virtue of the bridge arrangement afforded by the presence of resistors 135 and 145, adjustment of the tap of either of the potentiometers 115 and 125 provides control of polarity as well as magnitude of the blue convergence winding current during the respective halves of the raster scanning interval; i.e., tap movement to one side of the electrical center of the respective potentiometer provides selection of a selectable magnitude of convergence winding current of one polarity, while tap movement to the other side of the electrical center establishes the magnitude of convergence winding current of the opposite polarity.

Each of the diodes 110 and 120 (as well as each of the previously described diodes 20, 30, 60, 70, 80 and 90) is shown in FIG. 7 as being shunted by a capacitor 110. Each of the capacitors 110 is of sufficiently small value (e.g., 680 uuf) to be effectively an open circuit at vertical convergence frequencies, but may be provided in a practical circuit to reduce the possibility of radio frequency radiation from certain types of diodes.

The red-green portion of the FIG. 7 circuit is as shown in the previously described FIG. 6. It will be noted that advantages described in connection with the FIG. 4 circuit with regard to height stability, temperature stability and center convergence independence are retained in the subsequently described circuits of FIGS. 5, 6 and 7. With regard to the center convergence independence advantage, for example, it will be noted that at the middle of raster scanning, none of the diodes 20, 30, 60, 70, 80, 90, 110 and 120 of FIG. 7 will be conducting, whereby substantially no current may flow in any of the convergence windings VBC, VRC, VGC, thus assuring that the various potentiometer tap adjustments will provide no interference with static convergence adjustments.

Presented below, by way of example, is a table of values for circuit parameters of the FIG. 7 circuit which may be employed to provide a satisfactorily operating circuit:

Resistor 19 — 3.3 ohms
Resistor 21 — 150 ohms
Resistor 81 — 330 ohms
Resistor 91 — 330 ohms
Resistor 135 — 100 ohms
Resistor 145 — 100 ohms
Potentiometer 115 — 90 ohms
Potentiometer 125 — 90 ohms
Potentiometer TV — 10 ohms
Potentiometer BV — 10 ohms
Potentiometer TH — 30 ohms
Potentiometer BH — 20 ohms
All diodes — Type FDH 600
All capacitors — 680 micromicrofarads

What is claimed is:

1. A dynamic convergence circuit for a multiple beam cathode ray tube including:

first and second convergence windings for producing respective magnetic fields primarily influencing respective ones of the multiple beams of said tube;

a first drive circuit coupled to one end terminal of each of said windings and effective during one portion of a scanning interval for establishing the flow of energizing currents through said windings, but ineffective for such flow establishment during a complementary portion of said scanning interval;

first and second potentiometers, each having a pair of fixed terminals and an adjustable tap;

means for coupling the remaining end terminal of said first convergence winding to one of the fixed terminals of each potentiometer;

means for coupling the remaining end terminal of said second convergence winding to the remaining fixed terminal of each potentiometer;

means for coupling the adjustable tap of said first potentiometer to a point in said first drive circuit to provide return path for currents established by said first drive circuit;

a second drive circuit coupled to the adjustable tap of said second potentiometer and effective during said complementary portion of said scanning interval for establishing the flow of energizing currents through said windings, but ineffective for such flow establishment during said one portion of said scanning interval;

a first drive source for said first drive circuit for supplying said energizing current during said one portion of said scanning interval;

a second drive source for said second drive circuit for supplying said energizing current during said complementary portion of said interval; and unidirectional current conducting means included in at least one of said coupling means for substantially precluding the flow of current in said return path during said complementary portion of said scanning interval.

2. A dynamic convergence circuit in accordance with claim 1 wherein said unidirectional current conducting means comprises a diode serially disposed between the adjustable tap of said first potentiometer and said first drive circuit point, and poled so as to be nonconducting during said complementary portion of said scanning interval.

3. A dynamic convergence circuit in accordance with claim 1 wherein said unidirectional current conducting means comprises a first diode serially disposed between said remaining end terminal of said first convergence winding and said one fixed terminal of said first potentiometer, and a second diode serially disposed between said remaining end terminal of said second convergence winding and said remaining fixed terminal of said first potentiometer, each of said first and second diodes being poled so as to be nonconducting during said complementary portion of said scanning interval, whereby current flow between the fixed terminals of said first potentiometer as well as current flow in said return path is substantially precluded during said complementary portion of said scanning interval.

4. A dynamic convergence circuit for a multiple beam cathode ray tube including:

first and second convergence windings for producing respective magnetic fields primarily influencing respective ones of the multiple beams of said tube;

a first drive circuit coupled to one end terminal of each of said windings and effective during one portion of a scanning interval for establishing the flow of energizing currents through said windings, but ineffective for such flow establishment during a complementary portion of said scanning interval;

first and second potentiometers, each having a pair of fixed terminals and an adjustable tap;

means for coupling the remaining end terminal of said first convergence winding to one of the fixed terminals of each potentiometer;

means for coupling the remaining end terminal of said second convergence winding to the remaining fixed terminal of each potentiometer;

means for coupling the adjustable tap of said first potentiometer to a point in said first drive circuit to provide return path for currents established by said first drive circuit;

a second drive circuit coupled to the adjustable tap of said second potentiometer and effective during said complementary portion of said scanning interval for establishing the flow of energizing currents through said windings, but ineffective for such flow establishment during said one portion of said scanning interval;

a first drive source for said first drive circuit for supplying said energizing current during said one portion of said scanning interval;

a second drive source for said second drive circuit for supplying said energizing current during said complementary portion of said interval; and unidirectional current conducting means included in at least one of said coupling means for substantially precluding the flow of current in said return path during said complementary portion of said scanning interval, said unidirectional current conducting means comprising a first diode serially disposed between said remaining end terminal of said first convergence winding and said one fixed terminal of said first potentiometer, and a second diode serially disposed between said remaining end terminal of said second convergence winding and said remaining fixed terminal of said first potentiometer, each of said first and second diodes being poled so as to be nonconducting during said complementary portion of said scanning interval, whereby current flow between the fixed terminals of said first potentiometer as well as current flow in said return path is substantially precluded during said complementary portion of said scanning interval;

said dynamic convergence circuit also including a third diode serially disposed between said remaining end terminal of said first convergence winding and said one fixed terminal of said second potentiometer, and a fourth diode serially disposed between the remaining end terminal of said second convergence winding and said remaining fixed terminal of said second potentiometer, each of said third and fourth diodes being poled so as to be nonconducting during said one portion of said scanning interval, whereby current flow between the fixed terminals of said second potentiometer is substantially precluded during said one portion of said scanning interval.

5. A vertical rate dynamic convergence circuit in accordance with claim 4 for use in association with the vertical deflection winding of a deflection yoke for said cathode ray tube, and wherein said first drive circuit includes; a third potentiometer having a pair of fixed terminals and an adjustable tap, said third potentiometer being connected in series with said vertical deflection winding such that deflection winding current passes between the fixed terminals thereof; a fifth diode coupled between the adjustable tap of said third potentiometer and said one end terminal of each of said convergence windings, said fifth diode being poled so as to be nonconducting during said complementary portion of said scanning interval; and a sixth diode coupled between a fixed terminal of said third potentiometer and said one end terminal of each of said convergence windings, said sixth diode being poled so as to be nonconducting during said one portion of said scanning interval.

6. A dynamic convergence circuit in accordance with claim 5 wherein said second drive circuit includes: a fourth potentiometer having a pair of fixed terminals and an adjustable tap, said fourth potentiometer being connected in series with said vertical deflection winding such that deflection winding current passes between the fixed terminals thereof; means for connecting the adjustable tap of said fourth potentiometer to the adjustable tap of said second potentiometer; and means, including said sixth diode, for connecting a fixed terminal of said fourth potentiometer to said one end terminal of each of said convergence windings, said sixth diode conducting during said complementary portion of said scanning interval to provide a return path for currents established by said second drive circuit.

7. In a vertical-rate convergence circuit including first and second convergence windings, each having first and second end terminals, the combination comprising:

a first drive circuit, including a first master current amplitude control, and a pair of output terminals, one of said pair of output terminals being coupled to the first end terminals of each of said convergence windings, said first drive circuit being effective for driving said windings with currents substantially only during a given half of a vertical scanning interval;

means for differentially varying the amplitude of energizing current in said first and second convergence windings during said given half of said vertical scanning interval, said differential amplitude varying means including a first potentiometer having a pair of fixed terminals and and adjustable tap;

first unidirectional current conducting means connected between the second end terminal of said first convergence winding and one fixed terminal of said first potentiometer, and second unidirectional current conducting means connected between the second end terminal of said second convergence winding and the remaining fixed terminal of said first potentiometer; said first and second unidirectional current conducting means substantially precluding the flow of current in said first potentiometer during the remaining half said vertical scanning interval;

bidirectional current conducting means coupled between said adjustable tap and the other of said pair of output terminals of said first drive circuit and providing a common return path for said winding current during said given half of said vertical scanning interval;

a second drive circuit, including a second master current amplitude control and a pair of output terminals, said second drive circuit being effective for driving said windings with currents substantially only during said remaining half of said vertical scanning interval;

means for differentially varying the amplitudes of energizing current in said first and second convergence windings during said remaining half of said vertical scanning interval, said differential amplitude varying means including a second potentiometer having a pair of fixed terminals and an adjustable tap;

third unidirectional current conducting means connected between the second end terminal of said first convergence winding and one fixed terminal of said second potentiometer, and fourth unidirectional current conducting means connected between the second end terminal of said second convergence winding and the remaining fixed terminal of said second potentiometer, said third and fourth unidirectional current conducting means substantially precluding the flow of current in said second potentiometer during said given half of said vertical scanning interval;

bidirectional current conducting means coupled between said adjustable tap of said second potentiometer and one of the pair of output terminals of said second drive circuit;

and fifth unidirectional current conducting means connected between said first end terminals of said convergence windings and the other of said pair of output terminals of said second drive circuit and providing a common return path for said winding currents during said remaining half of said vertical scanning interval.

8. A vertical rate dynamic convergence circuit for a cathode ray tube having multiple beams subject to scanning in horizontal and vertical directions under control of periodic waveforms developed in respective horizontal and vertical deflection circuits, said convergence circuit including:

first and second potentiometers, each having a resistive element extending between a pair of fixed terminals and an adjustable tap thereon;

means, including a first diode, for establishing only during the first half of each vertical scanning interval a first current path between the adjustable tap of said first potentiometer and a point in said vertical deflection circuit, said first current path including as serial elements said first diode in a conducting mode, said first convergence coil, and the portion of the resistive element of said first potentiometer presented between one of the fixed terminals thereof and the adjustable tap thereon;

means, including a second diode, for establishing only during said first half of each vertical scanning interval a second current path between the adjustable tap of said first potentiometer and a point in said vertical deflection circuit, said second current path including as serial elements said second diode in a conducting mode, said second convergence coil, and the portion of the resistive element of said first potentiometer presented between the other of the fixed terminals thereof and the adjustable tap thereon;

means, including a third diode, for establishing only during the second half of each vertical scanning interval a third current path between the adjustable tap of said second potentiometer and a point in said vertical deflection circuit, said third current path including as serial elements said third diode in a conducting mode, said first convergence coil, and the portion of the resistive element of said second potentiometer presented between one of the fixed terminals thereof and the adjustable tap thereon;

means, including a fourth diode, for establishing only during the second half of each vertical scanning interval a fourth current path between the adjustable top of said second potentiometer and a point in said vertical deflection circuit, said fourth current path including as serial elements said fourth diode in a conducting mode, said second convergence coil, and the portion of the resistive element of said second potentiometer presented between the other of the fixed terminals thereof and the adjustable tap thereon;

conducting by said first and second diodes and nonconduction by said third and fourth diodes during said first half of each vertical scanning interval permitting current flow in the respective portions of the resistive element of said first potentiometer while precluding current flow between the fixed terminals of said second potentiometer, whereby adjustment of the tap of said first potentiometer provides differential amplitude control of the currents in said first and second convergence coils during said first half of each vertical scanning interval with independence from effects of the adjustment of the tap of said second potentiometer and freedom from adjustment range reducing effects of unbalance current flow between the fixed terminals of said second potentiometer;

conduction by said third and fourth diodes and nonconduction by said first and second diodes during said second half of each vertical scanning interval permitting current flow in the respective portions of the resistive element of second potentiometer while precluding current flow beteween the fixed terminals of said first potentiometer, whereby adjustment of the tap of said second potentiometer provides differential amplitude control of the currents in said first and second convergence coils during said second half of each vertical scanning interval with independence from effects of the adjustment of the tap of said first potentiometer and freedom from adjustment range reducing effects of unbalance current flow between the fixed terminals of said first potentiometer.

* * * * *